United States Patent [19]

Economy et al.

[11] Patent Number: 4,614,629
[45] Date of Patent: Sep. 30, 1986

[54] ROTATIONAL COMPRESSION PROCESS FOR FORMING LIQUID CRYSTALLINE POLYMERS WITH ULTRA-HIGH MECHANICAL PROPERTIES

[75] Inventors: James Economy, San Jose; Anagnostis E. Zachariades, Hillsborough, both of Calif.

[73] Assignee: International Business Machines Corporation, Armonk, N.Y.

[21] Appl. No.: 574,319

[22] Filed: Jan. 27, 1984

Related U.S. Application Data

[63] Continuation-in-part of Ser. No. 533,083, Sep. 19, 1983, abandoned, which is a continuation of Ser. No. 363,355, Mar. 19, 1982, abandoned.

[51] Int. Cl.$^4$ ............................................. B29C 41/04
[52] U.S. Cl. ............................... 264/176.1; 264/310; 264/328.12; 528/176; 528/302; 528/308.2
[58] Field of Search ............... 264/310, 328.12, 176 R

[56] References Cited

U.S. PATENT DOCUMENTS

| | | | |
|---|---|---|---|
| 3,356,242 | 12/1967 | Cleereman | 264/310 |
| 3,647,614 | 3/1972 | Cleereman | 264/255 |
| 3,907,952 | 9/1975 | Cleereman | 264/312 |
| 4,288,478 | 9/1981 | Kinoshita et al. | 264/312 |
| 4,305,902 | 12/1981 | Uhlig | 264/328.12 |

OTHER PUBLICATIONS

Zachariades et al, Liquid Crystalline Behaving Polymers, In Polymer News, 8(5), 144 (1982).
Ultra-High Modulus Polymers, edited by Ciferri and Ward, pp. 227–250, Applied Science Pub., London, 1979.

*Primary Examiner*—James Derrington
*Attorney, Agent, or Firm*—Joseph G. Walsh

[57] ABSTRACT

A process for making a polymer with ultra-high mechanical properties by subjecting to compression and rotation in a contained geometry at a viscosity in the range of from 50 to $10^4$ poise an aromatic liquid crystalline copolyester.

4 Claims, 8 Drawing Figures

FLOW PROFILES
SURFACE

INJECTION MOLDING

ROTATIONAL COMPRESSION MOLDING

ROTATIONAL INJECTION MOLDING

BULK

CONTAINED GEOMETRIES

UPPER PLATE →
LOWER PLATE →
ONE PLATE ROTATING

UPPER MOLD CAVITY    LOWER MOLD CAVITY
HALF MOLD CAVITY ROTATING

ROTATIONAL COMPRESSION PROCESS FOR FORMING LIQUID CRYSTALLINE POLYMERS WITH ULTRA-HIGH MECHANICAL PROPERTIES

DESCRIPTION

The present application is a continuation-in-part of copending application Ser. No. 06/533,083 filed Sept. 19, 1983, now abandoned, which application was a continuation of application Ser. No. 06/363,355 filed Mar. 19, 1982, now abandoned.

TECHNICAL FIELD

The present invention deals with a process for producing multiaxially oriented polymers with ultra-high planar mechanical and impact properties from aromatic liquid crystalline copolyesters.

BACKGROUND ART

U.S. Pat. Nos. 2,372,177; 3,356,242, 3,647,614, 3,907,952 and 4,288,478 show the application of rotary force during the molding of a polymer to minizize directional weakness. The polymers of these prior art references are all semicrystalline polymers in sharp and clear distinction to the present invention, wherein the polymers are aromatic liquid crystalline copolyesters.

Formation of fibers, rods or films through the application of tensile or compressive force during the solid state deformation (drawing and extrusion) of a polymer to achieve high modulus in one direction only is also well known. To date no one has successfully achieved the development of a homogeneous composition with ultra-high mechanical performance in more than one direction. The only available technique is through the use of fiber reinforced composites which require expensive and time consuming lay-up techniques. In the present invention an approach is described to achieve ultra-high mechanical performance in planar directions. By this technique flat shapes, disks, cylinders etc. can be formed with planar mechanical properties far superior to values obtained with typical engineering plastics. The reason for the unusually high planar mechanical properties is related to the formation of a microfibrillar morphology.

DISCLOSURE OF THE INVENTION

According to the present invention, an aromatic liquid crystalline copolyester is processed at controlled viscosity under the combined effects of a compressive force and a rotational force perpendicular to the compressive force. This is carried out in a contained geometry at a melt viscosity in the range of from 50 to $5 \times 10^4$ poise. By this technique the orientation of the chains can be controlled to resemble a cross ply laminated structure. As a result, the mechanical properties such as tensile modulus are dramatically increased in the plane of rotation. By proper control of the compressive and rotational forces, it is possible by this invention to increase the planar mechanical properties as compared to the transverse properties. Another feature of this invention relates to the unique orientations that one can achieve in the polymer morphology. For example, in injection molding a disk using a center gated mold, radial orientation is obtained which, when superimposed with circumferential orientation will produce controlled ultra-high planar mechanical properties. In this fashion samples have been formed with thickness ranging from 3 mils to ⅛ inch which indicates considerable versatility in processing a wide range of thicknesses and shapes.

The polymeric materials which are considered suitable for this application are limited to aromatic polyesters and copolyesters which form a liquid crystalline phase on heating or on heating and applying shear. Such polymers are characterized by a rigid rodlike configuration along the main chain which may persist up to 100s of Angstroms. The term "aromatic polyesters" is exemplified but not limited to homopolymers such as ring substituted p-hydroxybenzoic acid or terephthalic acid and hydroquinone. Similarly, the term "aromatic copolyesters" is exemplified by combination of comonomers such as p-hydroxybenzoic acid with hydroquinone and terephthalic acid. There are many variations where any one of these comonomers can be substituted. For example, ethylene glycol or p p'-biphenol can be used in place of hydroquinone, while naphthalene-2,6-carboxylic acid can be used in place of terephthalic acid. Further control of the properties can be achieved by incorporating appropriate substituents on the aromatic rings such as $CH_3-$, $Cl-$, phenyl, $CH_3O-$ or by use of controlled amounts of meta groups such as in isophthalic acid.

Typically, the viscosity of liquid crystalline polymers is lower than the viscosity of semicrystalline polymers of similar molecular weight when both are measured at the same temperature. The viscosity of liquid crystalline polymers also shows far greater shear sensitivity. The viscosity of the liquid crystalline polymers varies significantly with composition, i.e. rigid rod content, with the shear rate and with temperature. The variation of the viscosity with these parameters is shown in FIG. 4 for the aromatic copolyesters of polyethyleneterephthalate and hydroxybenzoic acid (PET/PHBA). The viscosity of PET homopolymer—a typical semicrystalline polymer—does not change significantly over the shear rate from $10^2$ to $10^4 \sec^{-1}$, whereas both copolyesters of PET/PHBA inhibit a significant viscosity drop from $10^2$ to $10^4 \sec^{-1}$. Also, the viscosity of the mesophase of the PET/PHBA 20/80 copolyester at 275° C. is at least one order of magnitude higher than the viscosity of the mesophase of the PET/PHBA 40/60 at the same temperature and is reduced significantly be heating the polymer at 330° C.

Conventional processing techniques such as extrusion and injection molding typically operate at shear rates from $10^2$ to $10^4 \sec^{-1}$. These techniques are amenable to the combination of rotational and rectilinear flow fields which are important for the development of planar mechanical properties. For processing these aromatic copolyesters according to the present invention, the viscosity of the polymers should be in the range of from 50 to $5 \times 10^4$ poise and preferably from 100 to $10^4$ poise. As the viscosity may vary greatly at a given temperature with the application of different shear rates, it is understood that such a viscosity range as 100–10000 poise may be realized by an appropriate selection of shear rate and temperature as would be obtained in typical injection molding and extrusion processes.

In carrying out the process of the present invention, the polymer is in a closed geometry under pressure, as for example in injection molding, compression molding or extrusion with a rotating conical die or variation thereof. The critical feature is that both compression and rotation are being applied to obtain multiaxially oriented polymers.

The process of the present invention allows for
(a) achievement of controlled ultra-high planar tensile modulus and strength;
(b) achievement of ultra-high flexular modulus;
(c) achievement of high impact strength; and
(d) the generation of controlled multiaxial orientation across the sample thickness without the need of fiber reinforcement.

These features may be obtained by processing the polymer in a contained geometry by rotation under compression within the specified viscosity range.

The present invention includes within its scope, aromatic copolyesters containing commonly used fillers.

To better illustrate the flow profiles and nature of the contained geometries, the following drawings have been provided.

BRIEF DESCRIPTION OF THE DRAWINGS

FIG. 1A is an example of conventional injection molding; FIG. 1B is an example of rotational compression molding; and FIG. 1C is a case of rotational injection molding.

FIG. 3A shows the case of one plate rotating, while 3B shows a half mold cavity rotating.

Figure 1A:
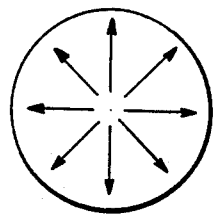
FIGS. 1A, 1B and 1C show surface flow profiles.
Figure 1B:
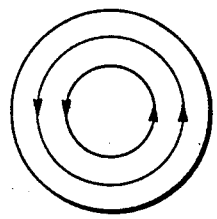
Figure 1C:
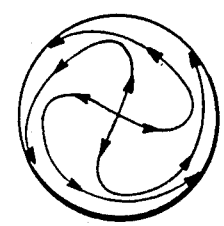
Figure 2A:
FIGS. 2A and 2B show the bulk flow and correspond respectively to FIGS. 1B and 1C.
Figure 2B:
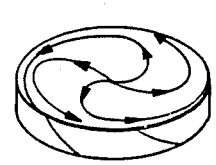
Figure 3A:
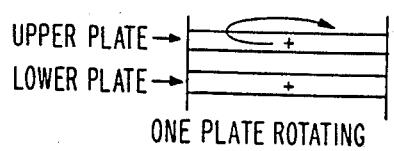
FIGS. 3A and 3B illustrate two types of contained geometries.
Figure 3B:
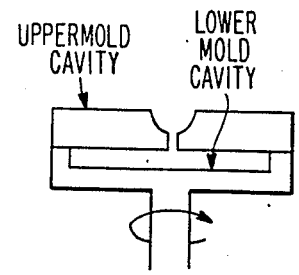
Figure 4:
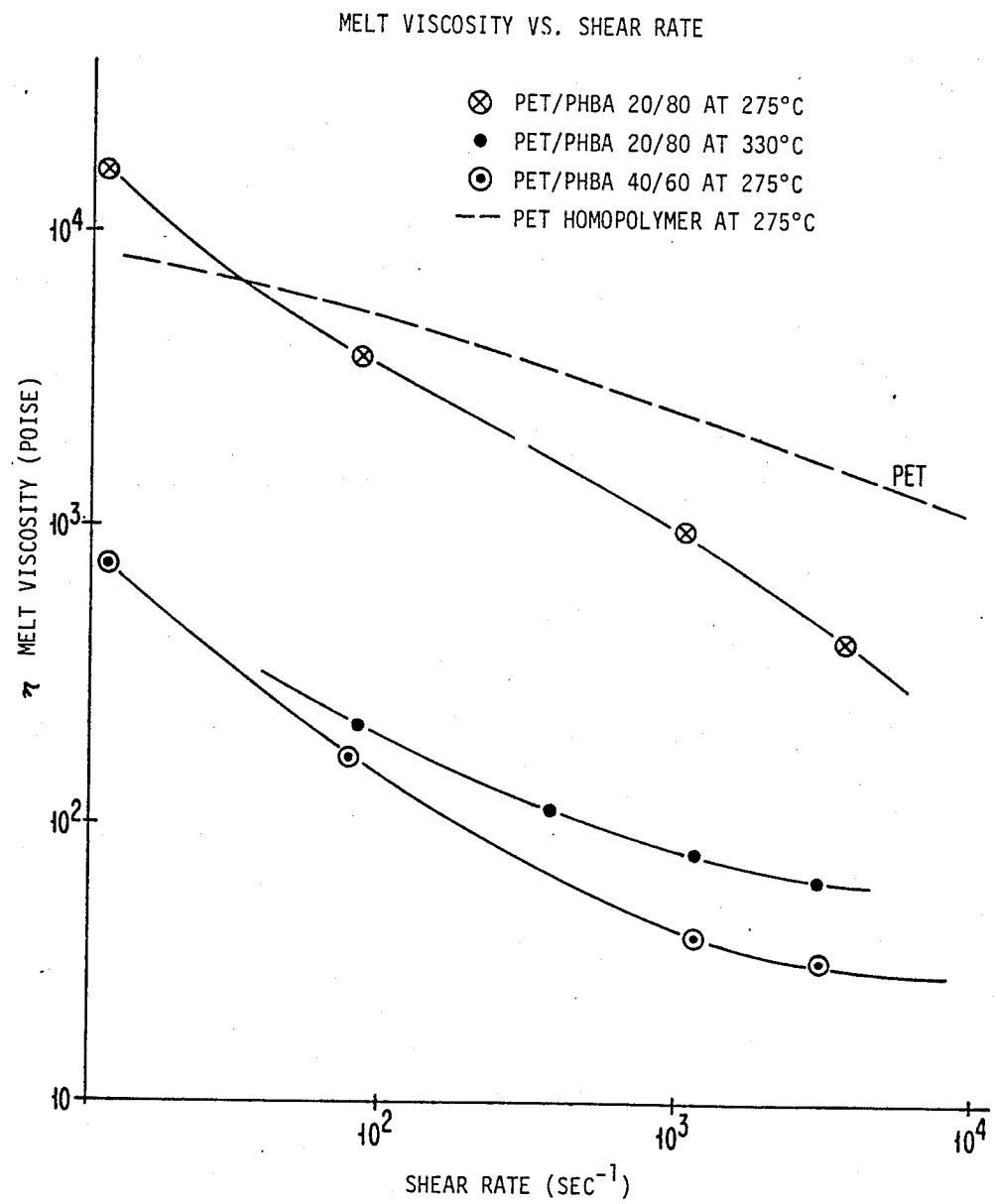
FIG. 4 is a graph plotting melt viscosity against shear rate. The graph shows data at the specified temperatures for the homopolymer polyethyleneterephthalate (PET) and for copolyesters of polyethyleneterephthalate and p-hydroxybenzoic acid (PET/PHBA) with the percentages by weight indicated.

In rotational compression the polymer is oriented by controlling the temperature and pressure conditions along the circular direction and tangentially to the radius of the disk. The velocity profile across the surface may vary and depends on the pressure, temperature and shear rate. The technique has been demonstrated with aliphatic and aromatic polymers. Although extensive chain crystalline alignment is achieved with aliphatic polymers, the mechanical performance is improved dramatically by processing polymers with inherent chain stiffness.

The term contained geometry is intended to incude not only the conditions in compression molding and injection molding, but also to include extrusion processes through converging dye geometries in which one of the surfaces is rotating perpendicular to the flow direction to provide the shear rotational force.

The key features of our process under rotational compression conditions are: (a) Adjustable pressure, temperature, viscosity and torque conditions; (b) Adjustable geometrical configuration to allow for the preparation of different shapes; (c) adjustable flow profiles to make orientation and consequently the mechanical performance beneficial in more than one direction.

We have demonstrated the effectiveness of rotational compression to produce multiaxially oriented polymer morphologies with high planar mechanical performance with aromatic liquid crystalline copolyesters such as polyethyleneterephthalate/poly-p-hydrobenzoic acid copolymers. The processed specimens were highly birefringent. The process has been demonstrated with the copolyesters using molds in which one-half of the mold cavity could rotate under compression when the polymer was within the specified viscosity range.

For the copolymer of poly(ethylene terephthalate) and 80 mole % p-hydroxybenzoic acid, the product of rotational compression (compression 5 atmospheres, rotation 28 rpm for 15 seconds and temperature about 270° C.) viscosity of $2-5 \times 10^2$ poise had a tensile modulus along the planar flow lines of about 20 GPa as compared to only three GPa for the isotropic molded material. (GPa=gigapaschals. One gigapaschal is equal to 145,000 pounds per square inch.)

We claim:

1. A process for forming a polymer of ultra-high mechanical properties, said process comprising the improvement of subjecting an aromatic liquid crystalline copolyester to a compressive force and a rotational force perpendicular to the compressive force in a contained geometry while the copolyester is within the range of from 50 to $10^4$ poise in melt viscosity.

2. A process as claimed in claim 1 wherein the copolyester is formed into a shape with ultra-high tensile properties in the planar direction.

3. A process as claimed in claim 1 wherein the viscosity is in the range of from 100 to $10^4$ poise.

4. A process as claimed in claim 1 wherein the copolyester is one formed from polyethylene terephthalate and p-hydroxybenzoic acid.

* * * * *